United States Patent

Hoffmann et al.

[11] Patent Number: 5,212,264
[45] Date of Patent: May 18, 1993

[54] MODIFIED POLYARYLENE ETHER SULFONES

[75] Inventors: Kurt Hoffmann, Lautertal; Thomas Kainmüller, Lindenfels/Odenwald; Rudolf Pfaendner, Rimbach/Odenwald, all of Fed. Rep. of Germany

[73] Assignee: Ciba-Geigy Corporation, Ardsley, N.Y.

[21] Appl. No.: 852,481

[22] Filed: Mar. 16, 1992

Related U.S. Application Data

[63] Continuation-in-part of Ser. No. 561,558, Aug. 1, 1990, abandoned.

[30] Foreign Application Priority Data

Aug. 9, 1989 [CH] Switzerland ............... 2924/89

[51] Int. Cl.$^5$ .................... C08G 63/66; C08G 63/68
[52] U.S. Cl. ...................... 525/534; 525/535; 528/97; 528/98; 528/99; 528/125; 528/172; 528/175
[58] Field of Search ............ 525/534, 535; 528/97, 528/98, 99, 172, 175, 125

[56] References Cited

U.S. PATENT DOCUMENTS

| | | | |
|---|---|---|---|
| 3,875,103 | 4/1975 | Leslie | 260/30.8 |
| 4,275,186 | 6/1981 | Kawakami et al. | 528/125 |
| 4,448,948 | 5/1984 | Tsubaki et al. | 528/99 |
| 4,736,000 | 4/1988 | Kashiwame et al. | 525/509 |
| 4,855,339 | 8/1989 | Saito et al. | 528/99 |
| 5,006,611 | 4/1991 | Schmid et al. | 525/534 |

FOREIGN PATENT DOCUMENTS 240421 10/1987 European Pat. Off. .
2547304 12/1984 France .

OTHER PUBLICATIONS

Encyclopedia of Polymer Science and Technology vol. 11 pp. 447, 452 & 453.
CA 109:191466h.
CA 103:54614s.
Chemical Abstract 103:54641s.
Chemical Abstract 103:196696u.

Primary Examiner—John C. Bleutge
Assistant Examiner—Frederick Krass
Attorney, Agent, or Firm—JoAnn Villamizar; William A. Teoli, Jr.

[57] ABSTRACT

There are disclosed substantially linear polyarylene ether sulfones having a reduced viscosity of having a reduced viscosity of ca. 0.25 to ca. 1.5 dl/g (measured in a 1% solution in DMF at 25° C.) and consisting essentially of 95–99.8% by weight of segments of formula I and of 5–0.2% by weight of segments of formula IIa, formula IIb and/or formula IIc

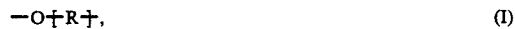

$-O\{R\}$, (I)

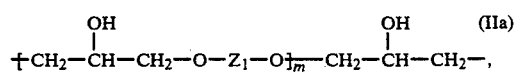

$$\{CH_2-\underset{OH}{\overset{|}{CH}}-CH_2-O-Z_1-O\}_m-CH_2-\underset{OH}{\overset{|}{CH}}-CH_2-,\quad (IIa)$$

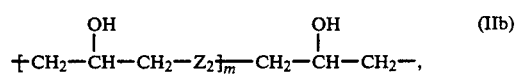

$$\{CH_2-\underset{OH}{\overset{|}{CH}}-CH_2-Z_2\}_m-CH_2-\underset{OH}{\overset{|}{CH}}-CH_2-,\quad (IIb)$$

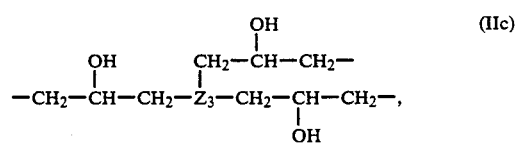

$$-CH_2-\underset{OH}{\overset{|}{CH}}-CH_2-Z_3\underset{}{\overset{CH_2-\overset{|}{CH}-CH_2-}{|}}-CH_2-\underset{OH}{\overset{|}{CH}}-CH_2-,\quad (IIc)$$

the percentages by weight being based on the entire polymer and the molecular weight (number average) of the segments of formula I being 6000 to ca. 60 000, if the polymer contains solely structural units of formula IIa and/or IIb, and 1000 to ca. 60 000 if the polymer contains more than 0.1% by weight of structural units of formula IIc, and R consists of the recurring structural units of formula Ia and/or of up to 99.8% by weight, based on the total polymer, of recurring structural units of formula Ib

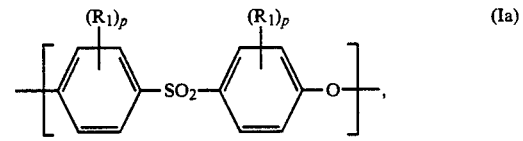

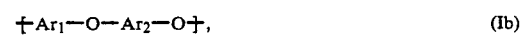

$\{Ar_1-O-Ar_2-O\}$, (Ib)

wherein $R_1$ is $C_1-C_6$alkyl, $C_3-C_{10}$alkenyl, phenyl or halogen, p is an integer from 0 to 4 $Ar_1$ and $Ar_2$ are each independently of the other divalent carbocylic-aromatic radicals, $Z_1$ is a divalent radical of a cycloaliphatic, aromatic or araliphatic dihydroxy compound after removal of both hydroxyl groups, $Z_2$ is a divalent radical of a cycloaliphatic, aromatic or araliphatic di-secondary amino compound after removal of both N-hydrogen atoms, m is an integer from 1 to ca. 10, and $Z_3$ is a trivalent radical of a cycloaliphatic, aromatic or araliphatic compound containing hydroxy and/or amino groups after removal of the hydroxyl groups and/or active hydrogen atoms bound to amino nitrogen atoms, which radicals $Ar_1$, $Ar_2$, $Z_1$, $Z_2$ and $Z_3$ may be substituted by one to four $C_1-C_6$alkyl groups, $C_3-C_{10}$alkenyl groups, phenyl groups or halogen atoms, and in which radicals $Z_1$, $Z_2$ and $Z_3$ one, two, three or four ring carbon atoms may be replaced by oxygen, sulfur and/or nitrogen atoms.

14 Claims, No Drawings

MODIFIED POLYARYLENE ETHER SULFONES

This application is a continuation-in-part, now abandoned of application Ser. No. 561,558, filed Aug. 1, 1990.

MODIFIED POLYARYLENE ETHER SULFONES

The present invention relates to novel modified polyethersulfones, to a process for their preparation, and to solutions containing these novel polymers.

Polyarylene ether sulfones are technical moulding materials which have very good mechanical properties, but are only insufficiently soluble in organic solvents. Typical examples of such polyarylene ether sulfones are the commercially available products Victrex ® PES sold by ICI and Ultrason ® E sold by BASF.

Solutions of such polyarylene ether sulfones are, in particular, not stable in chlorinated hydrocarbons. For different utilities, however, a good stable solubility in organic solvents is desirable. For example, the modification of thermosetting matrix resins with polyarylene ethers is usually carried out with preferably concentrated solutions of these polymers in customary organic solvents.

A coating solution for polyether sulfones is claimed in U.S. Pat. No. 3,875,103. The solution requires selected solvents and a chosen mixture ratio of the components.

Polyarylene ethers which can be obtained by chain lengthening of oligomeric hydroxyl-terminated polyarylene ethers with substantially equimolar amounts of difunctional coupling components, including also diglycidyl ethers, are disclosed in U.S. Pat. No. 4,275,186. Compared with the unmodified polyether sulfone, the disclosed diglycidyl ether-modified products have a markedly lower glass transition temperature. A lowering of the glass transition temperature is normally not desirable, as the performance temperatures of the polymer moulding material are thereby lowered.

Polysiloxane-modified polyarylene ethers are known from French patent 2 547 304. The proportion by weight of siloxane radicals is usually more than 10%, based on the polymer. Compared with the corresponding unmodified polyarylene ether sulfones, the siloxane radicals in these copolymers bring about a substantial lowering of the glass transition temperature.

Modified polyarylene ether sulfones have now been found which have good solubility in a number of solvents with which solutions having improved shelf-life can be prepared, and which, in comparison with the corresponding unmodified polyarylene ether sulfones, exhibit almost no lowering of the glass transition temperature.

The present invention relates to substantially linear polyarylene ether sulfones having a reduced viscosity of ca. 0.25 to ca. 1.5 dl/g (measured in a 1% solution in DMF at 25° C.) and consisting essentially of 95-99.8% by weight of segments of formula I and of 5-0.2% by weight of segments of formula IIa, formula IIb and/or formula IIc $$-O+R+, \quad (I)$$

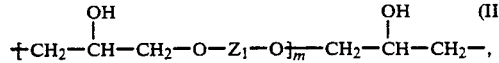

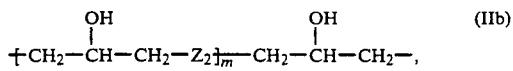

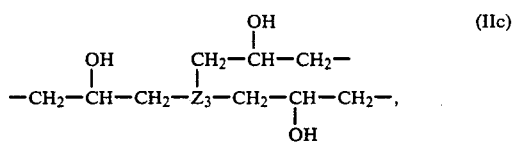

the percentages by weight being based on the entire polymer and the molecular weight (number average) of the segments of formula I being 6000 to ca. 60 000, if the polymer contains solely structural units of formula IIa and/or IIb, and 1000 to ca. 60 000 if the polymer contains more than 0.1% by weight of structural units of formula IIc, and R consists of the recurring structural units of formula Ia and/or of up to 99.8% by weight, based on the total polymer, of recurring structural units of formula Ib

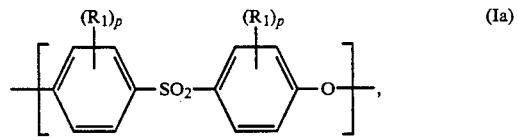

wherein $R_1$ is $C_1$-$C_6$alkyl, $C_3$-$C_{10}$alkenyl, phenyl or halogen, p is an integer from 0 to 4, $Ar_1$ and $Ar_2$ are each independently of the other divalent carbocyclic-aromatic radicals, $Z_1$ is a divalent radical of a cycloaliphatic, aromatic or araliphatic dihydroxy compound after removal of both hydroxyl groups, $Z_2$ is a divalent radical of a cycloaliphatic, aromatic or araliphatic disecondary amino compound after removal of both N-hydrogen atoms, m is an integer from 1 to ca. 10, and $Z_3$ is a trivalent radical of a cycloaliphatic, aromatic or araliphatic compound containing hydroxy and/or amino groups after removal of the hydroxyl groups and/or active hydrogen atoms bound to amino nitrogen atoms, which radicals $Ar_1$, $Ar_2$, $Z_1$, $Z_2$ and $Z_3$ may be substituted by one to four $C_1$-$C_6$alkyl groups, $C_3$-$C_{10}$alkenyl groups, phenyl groups or halogen atoms, and in which radicals $Z_1$, $Z_2$ and $Z_3$ one, two, three or four ring carbon atoms may be replaced by oxygen, sulfur and/or nitrogen atoms.

The reduced viscosity of the polymers of this invention extends over a range of ca. 0.25 to ca. 1.5 dl/g, corresponding to a molecular weight range of ca. 10 000 to ca. 120 000 (number average). Preferred polymers have a molecular weight (number average) in the range from 15 000 to 60 000.

The expression "essentially linear" will be understood as meaning that the polymers of this invention either form linear chains or have such a degree of branching that they will readily dissolve in a conventional organic solvent, for example in a chlorinated hydrocarbon.

Radicals defined as $C_1$-$C_6$alkyl are branched or, preferably, straight-chain radicals. Straight-chain alkyl radicals of one to three carbon atoms are preferred. Methyl is especially preferred.

Alkyl radicals are typically methyl, ethyl, n-propyl, isopropyl, n-butyl, sec-butyl, n-pentyl and n-hexyl.

Radicals defined as $C_3$-$C_{10}$alkenyl are branched or, preferably, straight-chain radicals.

Alkenyl radicals are typically propenyl, allyl or methallyl.

Halogen substituents are conveniently fluoro, iodo or, preferably, chloro or bromo.

Radicals defined as divalent carbocyclic-aromatic radicals or as divalent radicals of an aromatic di-secondary amino compound after removal of both N-hydrogen atoms or trivalent radicals of an aromatic compound containing hydroxyl and/or amino groups after removal of the hydroxyl groups and/or active hydrogen atoms bound to amino nitrogen atoms are usually aromatic hydrocarbon radicals carrying six to fourteen ring carbon atoms which may be substituted by the radicals cited above. Polynuclear aromatic radicals may be in the form of condensed systems, or several aromatic systems such as phenylene radicals are attached to one another through a direct bond or through linking groups such as an —O—, —S—, —SO—, —$SO_2$—, —CO—, —$CH_2$—, —C($CH_3$)$_2$— or —C($CF_3$)$_2$— group.

Representative of such aromatic hydrocarbon radicals are phenylene, naphthylene, biphenylene and two, three or four phenylene radicals which are attached to one another through linking groups.

The aromatic hydrocarbon radicals are usually unsubstituted. They may, however, in turn also carry one to four substituents, for example $C_1$-$C_6$alkyl groups, halogen atoms or preferably $C_3$-$C_{10}$alkenyl groups.

$Z_1$ as a divalent radical of a cycloaliphatic dihydroxy compound after removal of both hydroxyl groups, or $Z_2$ as a divalent radical of a cycloaliphatic di-secondary amino compound after removal of both N-hydrogen atoms, or $Z_3$ as a trivalent cycloaliphatic radical of a compound containing hydroxyl and/or amino groups after removal of the hydroxyl groups and/or active hydrogen atoms bound to amino nitrogen atoms, are usually cycloalkylene groups carrying five or six ring carbon atoms which may be substituted by the radicals cited above and/or which may form part of an alkylene chain.

Representative examples of cycloalkylene radicals are cyclopentylene, cyclohexylene, methylcyclohexylene, 1,4-bismethylenecyclohexane and 4,4'-methylenebis(cyclohex-1-yl).

An araliphatic radical may be the xylylene radical.

In the cyclic radicals $Z_1$, $Z_2$ and/or $Z_3$, one to four ring carbon atoms may also be replaced by oxygen, sulfur and/or nitrogen atoms. These may be aromatic or non-aromatic heterocyclic systems which preferably have five or six members. Preferably one to three ring carbon atoms are replaced by nitrogen atoms or one or two ring carbon atoms by oxygen or sulfur atoms. Different hetero atoms may also be present in a ring, for example a nitrogen atom and an oxygen atom.

The hetero atoms in $Z_2$ may be secondary amino groups contained in the ring system.

The index p is preferably 0.

$Ar_1$ is preferably a radical of formulae IIIa to IIIe

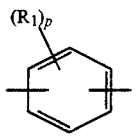
(IIIa)

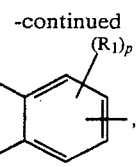
(IIIb)

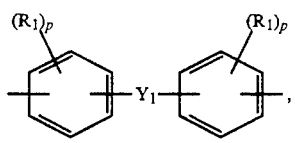
(IIIc)

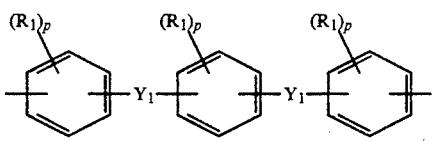
(IIId)

or

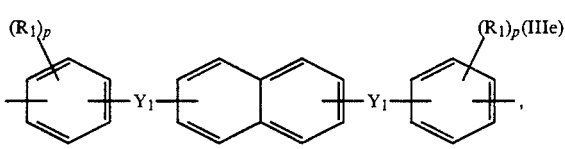
($R_1$)$_p$(IIIe)

wherein $R_1$ and p are as defined above, $Y_1$ is a direct bond, —$SO_2$—, —CO—, —S—, —SO—, —$CH_2$—, —C($CH_3$)$_2$—, —C($C_6H_5$)$_2$—, —C($CH_3$)($C_6H_5$)— or —C($CF_3$)$_2$—.

$Ar_2$ is preferably a radical of the above defined formulae IIIc, IIId and IIIe, wherein $Y_1$ is —$SO_2$, —CO— or —$SO_2$—.

$Z_1$ is preferably a radical of formulae IVa to IVg

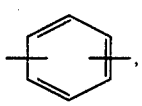
(IVa)

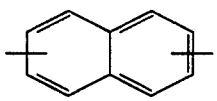
(IVb)

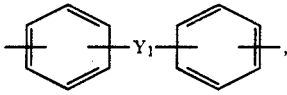
(IVc)

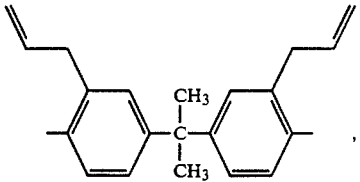
(IVd)

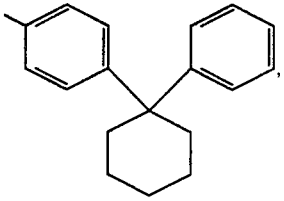
(IVe)

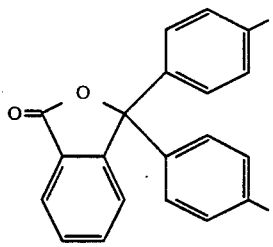

or

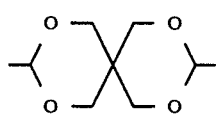

(IVg), wherein $Y_1$ is a direct bond, —SO$_2$—, —CO—, —S—, —SO—, —CH$_2$—, —C(CH$_3$)$_2$—, —C(C$_6$H$_5$)$_2$—, —C(CH$_3$)(C$_6$H$_5$)— or —C(CF$_3$)$_2$—.

Preferably $Z_1$ is a radical of formula

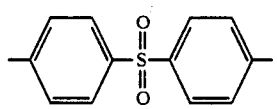

preferably

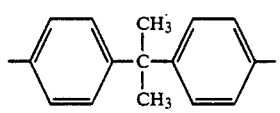

and

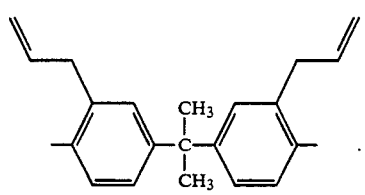

The index m is preferably an integer from 1 to 3. $Z_2$ is preferably a radical of formulae Va to Vj

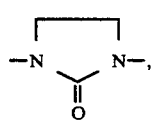
(Va)

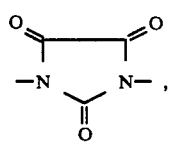
(Vb)

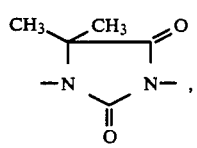
(Vc)

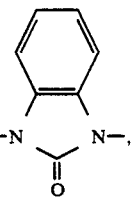
(IVf)

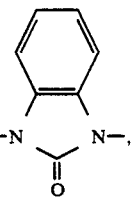
(Vd)

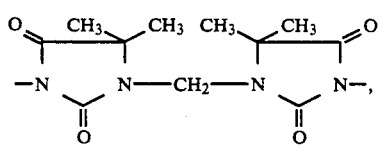
(Ve)

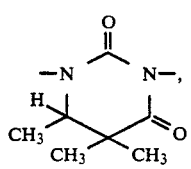
(Vf)

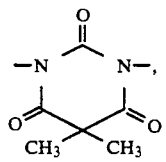
(Vg)

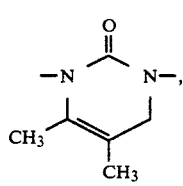
(Vh)

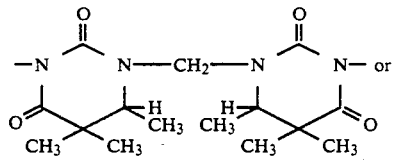
(Vi) or

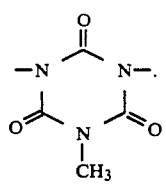
(Vj)

Particularly preferred polyarylene ether sulfones of this invention contain the radicals Ar$_1$ of formulae

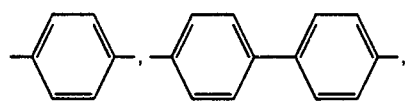

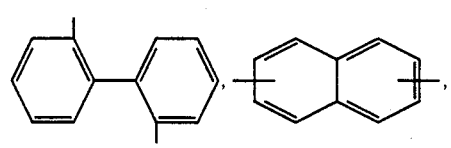

-continued

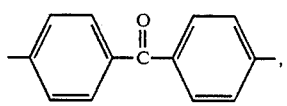

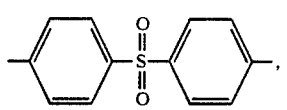

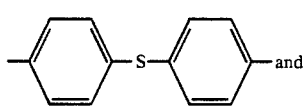

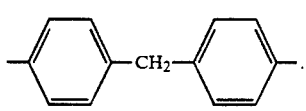

Further particularly preferred polyarylene ether sulfones of this invention contain the radicals Ar₂ of formulae

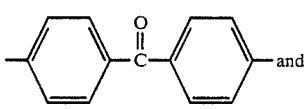

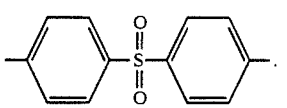

Yet further particularly preferred polyarylene ether sulfones of this invention contain the radicals Z₁ of formulae

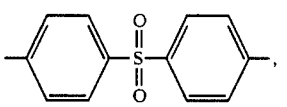

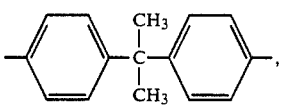

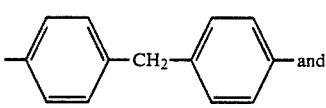

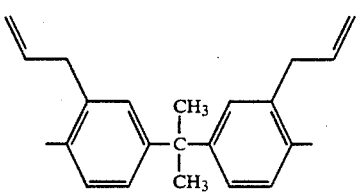

More particularly preferred polyarylene ether sulfones of this invention contain the radicals Z₃ of formulae

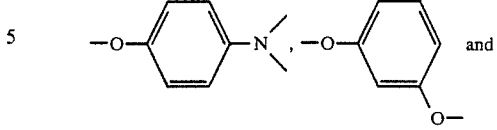

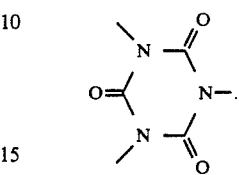

The most preferred polyarylene ether sulfones of this invention are those in which the segments of formula I have a molecular weight (number average) of 8000 to 20 000, if the polymer contains solely structural units of formula IIa and/or IIb, and 2000 to 20 000 if the polymer contains more than 0.1% by weight of structural units of formula IIc.

Among these types, those polyarylene ether sulfones are especially preferred in which the segments of formula I have a molecular weight (number average) of 8000 to 20 000 or 2000 to 20 000, and the radicals Ar₁ are selected from the group consisting of

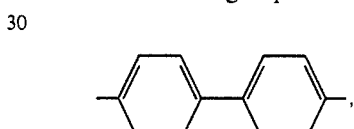

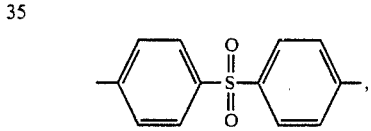

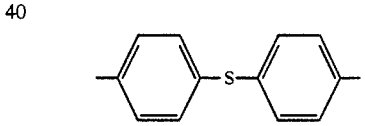

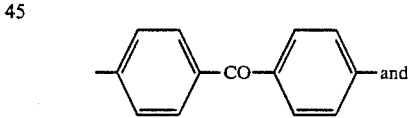

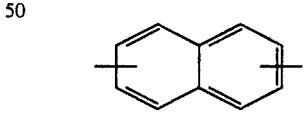

and in which Ar₂ is a radical of formula

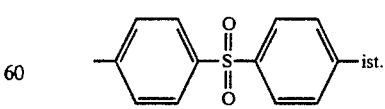

More preferably the polyarylene ether sulfones of this invention consist of 95–99.8% by weight of segments of formula I, wherein R is a recurring structural unit of formula Ia, and 0.2–5% by weight of segments of formula IIa, wherein m is 1 or 2, the percentages being based on the total polymer.

Most preferably, the polymers of this invention contain 0.2-2% by weight of the segments of formulae IIa, IIIb and/or IIc, based on the total polymer.

The modified polymers of the invention normally carry preponderantly phenolic end groups. Further specific end groups can be prepared by consecutive reactions. For example, alkoxy or acyloxy end groups can be obtained by reacting a hydroxyl-terminated polymer of this invention with an alkyl halide or with a monocarbonyl halide. The polymers of this invention are usually amorphous or partially crystalline.

The modified polyarylene ether sulfones can be prepared by reacting 95-99.8% by weight of hydroxyl-terminated polyarylene ether sulfone prepolymers of formula VI

HO—R—H    (VI), wherein R is as defined above, with 5-0.2% by weight of a glycidyl compound of formula VIIa, formula VIIb and/or formula VIIc, the percentages being based on the total mixture,

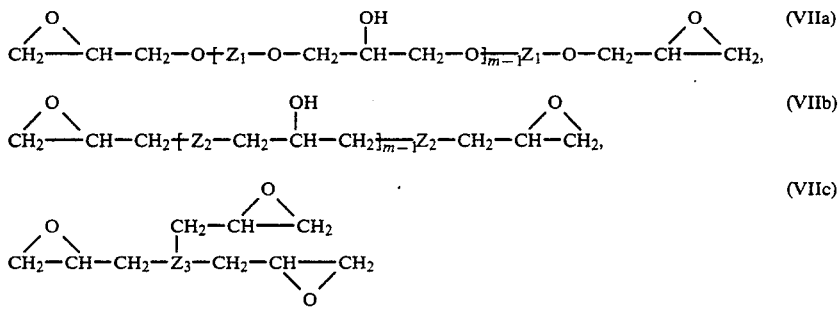

and wherein $Z_1$, $Z_2$, $Z_3$ and m are as defined above.

The starting polyarylene ether sulfone prepolymers of formula VI have a molecular weight (number average) of 6000 to ca. 60 000 (in the case of prepolymers containing structural units of formula IIa and/or IIb) or 1000 to 60 000 (in the case of prepolymers containing structural units of formula IIc).

These prepolymers can be prepared in a manner which is known per se by reacting a bisphenol of formula VIa and one or more optional additional bisphenols of formula VIb and an aromatic dihalosulfone of formula VIIIa and one or more optional additional activated dihalo compounds VIIIb

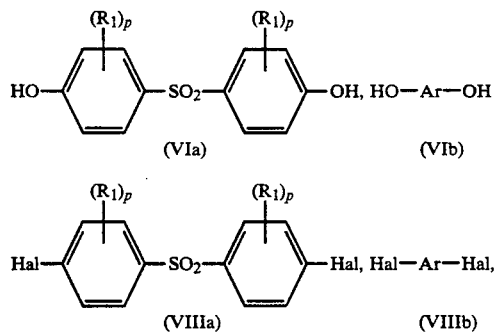

wherein $R_1$ and p are as defined above, Hal is a halogen atom, preferably a chlorine or fluorine atom, and Ar has one of the meanings given above for $Ar_1$ or $Ar_2$, while Ar in formula VIIIb is a nucleophilic group such as —$SO_2$—, —CO— or —SO— in ortho- or para-position to the leaving group Hal.

An excess of the bisphenol component is normally used in this reaction, so that hydroxyl-terminated derivatives are formed. The quantity ratios are chosen in a manner known per se, so that prepolymers of the desired molecular weight are obtained.

It is, however, also possible to use an excess of the aromatic dihalo component and to convert the dihalo-terminated prepolymers by treatment with a base, for example sodium or potassium hydroxide, into the appropriate hydroxyl-terminated prepolymer.

It will, of course, be readily understood that monomers each containing one halogen atom and one hydroxyl group in each molecule can also be used to prepare the prepolymers.

The preparation of the prepolymers is normally carried out in solution. This is usually done by choosing a solvent in which both starting materials and the prepolymer are at least partially soluble. Typical examples of such solvents are polar aprotic solvents such as dimethyl sulfoxide, N-methylpyrrolidone, N,N-dimethylacetamide, N,N'-dimethylpropyleneurea, N-cyclohexylpyrrolidone, N-alkylcaprolactams or, preferably, diphenyl sulfone.

The reaction is preferably carried out in the presence of a base to neutralise the hydrogen halide which evolves. Typical examples of suitable base are NaOH or KOH and, preferably, $Na_2CO_3$, $K_2CO_3$ or mixtures of alkali metal or alkaline earth metal carbonates.

The diglycidyl ethers of formula VIIa or N,N'-diglycidyl compounds of formula VIIb or triglycidyl compounds of formula VIIc are known per se and some are commercially available.

Illustrative of particularly preferred compounds of formula VIIa are the diglycidyl ethers of bisphenol F, dihydroxydiphenylsulfone, diallyl bisphenol A and, preferably, of bisphenol A.

The modification of the prepolymers can be carried out in a solution of a high-boiling inert solvent. The solvent is so chosen that both starting components and the reaction product are at least partially dissolved therein. A typical high-boiling solvent which may be used is diphenyl sulfone. Normally the prepolymer will be charged to the solvent, which may be in the melt state, followed by the addition of the glycidyl compound or of a solution of the glycidyl compound in an inert solvent. The modification can be carried out in the presence or absence of further ingredients or catalysts by reacting phenol or phenolate groups with epoxy groups. Preferably the reaction mixtures obtained in the synthesis of the prepolymers are used direct for the modification, without dilution or after dilution with an organic solvent. Suitable catalysts for the modification reaction may be the bases which are also used for the preparation of the prepolymers. The reaction temperature is chosen such that a sufficient reaction rate is ensured. The reaction temperatures are typically in the range from 100° to 200° C.

Component VI is preferably reacted with component(s) VIIa, VIIb and/or VIIc in a molar ratio of ca. 1.1:1 to 10:1.

The thermoplastic polyarylene ether sulfones may be used in the conventional manner for thermoplastics and are processed, for example, to mouldings or sheets, or used as matrix resins, adhesives or coating compositions.

Prior to processing the polymers which may be in the form of moulding powders, melts or, preferably, solutions, it is possible to add conventional modifiers such as fillers, pigments, stabilisers, or reinforcing agents such as carbon, boron, metal or glass fibres. The polymers of this invention can also be processed together with other thermoplastics or thermosetting plastics.

The preferred utility of the polyethylene ether sulfones of this invention is as matrix resins for the fabrication of fibrous composite systems for which the fibres conventionally used for reinforcing technical moulding compounds may be used. These fibres can be organic or inorganic fibres, natural fibres or synthetic fibres, and can also be in the form of fibre bundles, of oriented or non-oriented fibres or of endless filaments.

A further preferred utility of the polyarylene ether sulfones of this invention is the modification of other plastics materials. These materials may be basically thermoplastics or thermosetting plastics. Such systems are especially suitable for use as matrix resins which are used for fabricating composite components.

To be singled out for special mention is the excellent solubility of the polymers in numerous conventional organic solvents, for example in fluorinated or chlorinated hydrocarbons, and the very good stability of the solutions obtained. Representative examples of suitable solvents are polar aprotic solvents such as N-methylpyrrolidone, N,N-dimethylacetamide, N,N-dimethylformamide, dimethylsulfoxide and sulfolane, as well as chlorinated aliphatic hydrocarbons such as methylene chloride, 1,2-dichloroethane and cyclic ketones such as cyclohexanone and cyclopentanone.

Hence the invention also relates to a solution containing ca. 1 to 75% by weight, preferably 5 to 50% by weight, based on the solution, of a solution of a polyarylene ether sulfone of this invention in an organic solvent.

The invention further relates to the use of the polyarylene ether sulfones, or solutions thereof, for making mouldings, coatings, sheets or fibrous composite structures.

The following Examples illustrate the invention.

I. PREPARATION OF LOW MOLECULAR POLYETHER SULFONE

Example A 626 g (2.5 mol) of 4,4'-dihydroxydiphenylsulfone, 703 g (2.45 mol) of 4,4'-dichlorodiphenylsulfone, 363 g (2.625 mol) of $K_2CO_3$ and 1400 g of diphenyl sulfone are heated to 180° C. in a 10 metal reactor while blanketing with $N_2$. After the temperature of the reaction mixture has reached 180° C., the batch is stirred for 2 hours. The water of condensation formed during the reaction is continuously removed from the reaction mixture by distillation through a descending condenser. After 2 hours at 180° C., the reaction temperature is raised to 260° C. stepwise over 2 hours and kept constant at this temperature for 4 hours. The reaction mixture is then discharged from the reactor through a bottom blow valve, cooled, and then coarsely ground. The ground reaction mixture is used for the next synthesis step.

A portion of the polymer is worked up by extraction (3×acetone/water=80/20; 1×water). Concentrated acetic acid is added during the aqueous extraction to liberate the OH end groups. The polyether sulfone is thereafter dried at 110° C. under vacuum. It has a reduced viscosity of $\eta_{red}=0.33$ dl/g (1% of polymer in DMF at 25° C.) and has an aromatic end group content of 110 μVal/g.

Example B 626 g (2.5 mol) of 4,4'-dihydroxydiphenylsulfone, 707 g (2.46 mol) of 4,4'-dichlorodiphenylsulfone, 363 g (2.63 mol) of $K_2CO_3$ and 1400 g of diphenylsulfone are reacted as described in Example A in a 10 l metal reactor and the reaction mixture is worked up. The polymer has a reduced viscosity of $\eta_{red}=0.42$ dl/g (1% of polymer in DMF at 25° C.) and an aromatic OH end group content of 70 μVal/g auf.

Example C 70.07 g (0.28 mol) of 4,4'-dihydroxydiphenylsulfone, 15.27 g (0.07 mol) of 4,4'-dihydroxydiphenylsulfide, 99.0 g (0.0345 mol) of 4,4'-dichlorodiphenylsulfone, 50.79 g (0.3675 mol) of $K_2CO_3$ and 184.34 g of diphenyl sulfone are reacted as described in Example A in a 1 l metal reactor (reaction conditions 180° C./2 h; 180°-260° C./2 h; 260° C./4 h). The resultant polymer has a reduced viscosity of $\eta_{red}=0.22$ dl/g (1% of polymer in DMF at 25° C.).

Example D 70.08 g (0.28 mol) of 4,4'-dihydroxydiphenylsulfone, 13.03 g (0.07 mol) of 4,4'-dihydroxydiphenylsulfide, 99.08 g (0.0345 mol) of 4,4'-dichlorodiphenylsulfone, 50.79 g (0.3675 mol) of $K_2CO_3$ and 182.19 g of diphenyl sulfone are reacted as described in Example A in a 1 l metal reactor (reaction conditions 180° C./2 h; 180°-260° C./2 h; 260° C./4.25 h). The resultant polymer has a reduced viscosity of $\eta_{red}=0.19$ dl/g (1% of polymer in DMF at 25° C.).

Example E 80.1 g (0.50 mol) of 2,7-dihydroxynaphthalene, 140.7 g (0.49 mol) of 4,4'-dichlorodiphenylsulfone, 72.69 g (0.525 mol) of $K_2CO_3$ and 220.8 g of diphenyl sulfone are reacted as described in Example A in a 1 l metal reactor (reaction conditions 180° C./2 h; 180°-260° C./2 h; 260° C./2 h). The resultant polymer has a reduced viscosity of $\eta_{red}=$ 0.20 dl/g (1% of polymer in DMF at 25° C.).

Example F 80.1 g (0.50 mol) of 1,6-dihydroxynaphthalene, 140.7 g (0.49 mol) of 4,4'-dichlorodiphenylsulfone, 72.6 g (0.525 mol) of $K_2CO_3$ and 220.8 g of diphenyl sulfone are reacted as described in Example A in a 1 l metal reactor (reaction conditions 180° C./2 h; 180°-260° C./2 h; 260° C./2 h). The resultant polymer has a reduced viscosity of $\eta_{red}=0.21$ dl/g (1% of polymer in DMF at 25° C.).

Example G 93.1 g (0.50 mol) of 4,4-dihydroxybiphenyl, 140.7 g (0.49 mol) of 4,4'-dichlorodiphenylsulfone, 72.6 g (0.525 mol) of $K_2CO_3$ and 223.8 g of diphenyl sulfone are reacted as described in Example A in a 1 l metal reactor (reaction conditions 180° C./2 h; 180°-260° C./2 h; 260° C./4 h). The resultant polymer has a reduced viscosity of $\eta_{red}$=0.22 dl/g (1% of polymer in DMF at 25° C.).

Example H 105 g (0.50 mol) of 4,4'-dihydroxybenzophenone, 140.7 g (0.49 mol) of 4,4'-dichlorodiphenylsulfone, 72.6 g (0.525 mol) of $K_2CO_3$ and 245.6 g of diphenyl sulfone are reacted as described in Example A in a 1 l metal reactor (reaction conditions 180° C./2 h; 180°-260° C./2 h; 260° C./3.75 h). The resultant polymer has a reduced viscosity of $\eta_{red}$=0.30 dl/g (1% of polymer in DMF at 25° C.).

II. PREPARATION OF A MODIFIED POLYETHER SULFONE

Example 1

To 2500 g of the reaction mixture prepared in Example A and containing 1250 g (0.068 mol) of low molecular polyether sulfone are added 625 g of diphenyl sulfone, and the mixture is completely fused in a 10 l metal reactor under $N_2$ at 150° C./2 h. Then 16.52 g (0.048 mol) of bisphenol A diglycidyl ether (BPADG), epoxy equivalent: 175.5-179 g/Val; 1.33% by weight, based on polyether sulfone) are added dropwise to the melt. The reaction is terminated 2 hours after the complete addition of the diglycidyl ether.

The reaction mixture is discharged from the reactor in pellet form and granulated direct. The reaction mixture is preground before further working up. The ground reaction mixture is then worked up by extraction (3×acetone/water=80/20; 1×water). Concentrated acetic acid is added during the aqueous extraction to liberate the OH end groups. The so modified polyether sulfone is thereafter dried at 110° C. under vacuum. It has a reduced viscosity of $\eta_{red}$=0.56 dl/g.

Examples 2-4

The procedure of Example 1 is repeated. The nature and amounts of the starting materials as well as the properties of the modified polyether sulfone are listed in Table 1.

Example 5

300 g of a reaction mixture prepared according to Example A and containing 120.4 g of low molecular polyether sulfone are reacted with 1.81 g (0.0042 mol) of diallyl bisphenol A diglycidyl ether (epoxide equivalent 217.9 g/Val, 1.50% by weight, based on the polyether sulfone) in a 1 l metal reactor. The procedure described in Example 1 is repeated. The properties of the resultant polyether sulfone are listed in Table 2.

Example 6

300 g of a reaction mixture prepared according to Example A and containing 120.4 g of low molecular polyether sulfone are reacted with 2.59 g (0.006 mol) of diallyl bisphenol A diglycidyl ether (epoxide equivalent 217.9 g/Val, 2.15% by weight, based on the polyether sulfone) in a 1 l metal reactor. The procedure described in Example 1 is repeated. The properties of the resultant polyether sulfone are listed in Table 2.

Example 7

49.83 g of a reaction mixture prepared according to Example A and containing 20.0 g of low molecular polyether sulfone are reacted with 0.20 g of bisphenol S diglycidyl ether (1.0% by weight, based on the polyether sulfone) in a 1 l metal reactor. The procedure described in Example 1 is repeated. The properties of the resultant polyether sulfone are listed in Table 2.

Example 8

49.83 g of a reaction mixture prepared according to Example A and containing 20.0 g of low molecular polyether sulfone are reacted with 0.26 g of bisphenol S diglycidyl ether (1.3% by weight, based on the polyether sulfone) in a 1 l metal reactor. The procedure described in Example 1 is repeated. The properties of the resultant polyether sulfone are listed in Table 2.

Example 9

45.0 g of a reaction mixture prepared according to Example C and containing 19.87 g of low molecular polyether sulfone are reacted with 0.339 g (0.00097 mol) of bisphenol A diglycidyl ether (1.97% by weight, based on the polyether sulfone) in a 1 l metal reactor. The procedure described in Example 1 is repeated. The properties of the resultant polyether sulfone are listed in Table 2.

Example 10

45.0 g of a reaction mixture prepared according to Example A and containing 19.87 g of low molecular polyether sulfone are reacted with 0.45 g (0.00128 mol) of bisphenol A diglycidyl ether (2.3% by weight, based on the polyether sulfone) in a 1 l metal reactor. The procedure described in Example 1 is repeated. The

TABLE 1
Synthesis of modified polyether sulfones

| | Polyether sulfone | | | | | | Modified polyether sulfone | | | | |
|---|---|---|---|---|---|---|---|---|---|---|---|
| Ex. | red.[1] visc. (dl/g) | OH[2] content (μVal/g) | Cl—[3] content (μVal/g) | $M_n$[4] | Molar ratio PES:BPADG[6] | Amount of BPADG[6] (% by wt.) | red. visc. (dl/g) | OH content (μVal/g) | $T_g$ (DSC) [°C.] | Solubility in $CH_2Cl_2$ | Stability[5] of solution (h) |
| 1 | 0.33 | 110 | 1 | 18200 | 1,43:1 | 1.33 | 0.56 | — | 232 | + | >120 |
| 2 | 0.33 | 110 | 1 | 18200 | 1.55:1 | 1.25 | 0.50 | 76 | 232 | + | >120 |
| 3 | 0.33 | 110 | 1 | 18200 | 1.91:1 | 1.00 | 0.48 | 110 | 230 | + | >120 |
| 4 | 0.42 | 70 | 10 | 25000 | 3.47:1 | 0.40 | 0.53 | — | 234 | + | >120 |

[1] 1% by weight of polymer in DMF at 25° C.
[2] Titration of the phenolic end groups with tetrabutylammonium hydroxide
[3] content of aromatic Cl = total Cl content - ion. Cl content (total Cl content: ashing/titration with $AgNO_3$; ion. Cl content: titration with $AgNO_3$)
[4] $M_n = 2/\Sigma$ (OH + Cl)
[5] The prepared solution remains stable over the indicated time, i.e. no turbidity, gelation or precipitation of the polymer results
[6] Epoxide equivalent: 175.5-179 g/Val properties of the resultant polyether sulfone are listed in Table 2.

Example 11

To 45.0 g of a reaction mixture prepared according to Example E and containing 17.2 g of low molecular polyether sulfone are added 6 g of diphenyl sulfone and the mixture is completely fused in a glass vessel under $N_2$ at 150° C. Then 0.26 g (0.75 mmol) of bisphenol A diglycidyl ether (1.50% by weight, based on the polyether sulfone) is added dropwise to the melt. The reaction mixture is subsequently stirred for 2 h at this temperature.

The reaction mixture is discharged from the reactor and coarsely ground. The ground reaction mixture is then worked up by extraction (3×acetone/water=80/20; 1×water). Concentrated acetic acid is added during the aqueous extraction to liberate the OH end groups. The so modified polyether sulfone is thereafter dried at 110° C. under vacuum. The properties of the polyether sulfone are listed in Table 2.

Example 12

30.0 g of a reaction mixture prepared according to Example F and containing 11.5 g of low molecular polyether sulfone are reacted with 0.27 g (0.75 mmol) of bisphenol A diglycidyl ether (2.35% by weight, based on the polyether sulfone) in a 1 l metal reactor. The procedure described in Example 11 is repeated. The properties of the resultant polyether sulfone are listed in Table 2.

Example 13

45.0 g of a reaction mixture prepared according to Example G and containing 17.66 g of low molecular polyether sulfone are reacted with 0.39 g (1.13 mmol) of bisphenol A diglycidyl ether (2.20% by weight, based on the polyether sulfone) in a 1 l metal reactor. The procedure described in Example 11 is repeated. The properties of the resultant polyether sulfone are listed in Table 2.

Example 14

45.0 g of a reaction mixture prepared according to Example H and containing 17.85 g of low molecular polyether sulfone are reacted with 0.36 g (1.13 mmol) of bisphenol A diglycidyl ether (2.0% by weight, based on the polyether sulfone) in a 1 l metal reactor. The procedure described in Example 11 is repeated. The properties of the resultant polyether sulfone are listed in Table 2.

Example 15

35.0 g of a reaction mixture prepared according to Example A and containing 14.07 g of low molecular polyether sulfone are reacted with 0.06 g (0.17 mmol) of N,N,O-triglycidyl-p-aminophenol diglycidyl ether (0.43% by weight, based on the polyether sulfone) in a 1 l metal reactor. The procedure described in Example 11 is repeated. The properties of the resultant polyether sulfone are listed in Table 2.

Example 16

450 g of a reaction mixture prepared according to Example A and containing 180.6 g of low molecular polyether sulfone are reacted with 1.35 g (4.8 mmol) of N,N,O-triglycidyl-p-aminophenol diglycidyl ether (0.75% by weight, based on the polyether sulfone) in a 1 l metal reactor. The procedure described in Example 11 is repeated. The properties of the resultant polyether sulfone are listed in Table 2.

Example 17*

35.0 g of a reaction mixture prepared according to Example A and containing 14.07 g of low molecular polyether sulfone are reacted with 0.116 g (0.40 mmol) of N,N,O-triglycidyl-p-aminophenol diglycidyl ether (0.82% by weight, based on the polyether sulfone) in a 1 l metal reactor. The procedure described in Example 11 is repeated. The properties of the resultant polyether sulfone are listed in Table 2.

TABLE 2

Synthesis of modified polyether sulfones

| | Polyether sulfone | | | | | Modified polyether sulfone | | | | |
|---|---|---|---|---|---|---|---|---|---|---|
| Ex. | Composition of Example | red. visc.[1] (dl/g) | Solubility[5,6] 5% in $CH_2Cl_2$ | Epoxide[4] | Amount of epoxide (% by wt.) | red.[1] visc. (dl/g) | OH[2] content (μVal/g) | $T_g$ (DSC) [°C.] | Solubil.[6] ity 10% in $CH_2Cl_2$ | Stabilität[3] der Lösung (h) |
| 5 | A | 0.33 | unstable sol. | b | 1.50 | 0.42 | 87 | 225 | stable solution | >50 |
| 6 | A | 0.33 | unstable sol. | b | 2.15 | 0.49 | 68 | 220 | stable solution | >50 |
| 7 | A | 0.33 | unstable sol. | c | 1.00 | 0.40 | — | — | stable solution | >50 |
| 8 | A | 0.33 | unstable sol. | c | 1.30 | 0.43 | — | — | stable solution | >50 |
| 9 | C | 0.22 | unstable sol. | a | 1.97 | 0.27 | — | 225 | stable solution | >50 |
| 10 | D | 0.19 | unstable sol. | a | 2.30 | 0.30 | — | 217 | stable solution | >50 |
| 11 | E | 0.20 | unstable sol. | a | 1.50 | 0.33 | — | 218 | stable solution | >50 |
| 12 | F | 0.21 | unstable sol. | a | 2.35 | 0.48 | — | 216 | stable solution | >50 |
| 13 | G | 0.22 | unstable sol. | a | 2.20 | 0.48 | — | 207 | stable solution | >50 |
| 14 | H | 0.30 | unstable sol. | a | 2.00 | 0.33 | — | 188 | stable solution | >50 |
| 15 | A | 0.33 | unstable sol. | d | 0.43 | 0.41 | — | 220 | stable solution | >50 |
| 16 | A | 0.33 | unstable sol. | d | 0.75 | 0.52 | 100 | 224 | stable solution | >50 |
| 17 | A | 0.33 | unstable sol. | d | 0.82 | 0.59 | — | 220 | stable solution | >50 |

[1] 1% by weight of polymer in DMF at 25° C.
[2] Titration of the phenolic end groups with tetrabutylammonium hydroxide
[3] The prepared solution remains stable over the indicated time, i.e. no turbidity, gelation or precipitation of the polymer results
[4] a = bisphenol A diglycidyl ether: epoxide equivalent: 175.5–179 g/Val
b = diallylbisphenol A diglycidyl ether: epoxide equivalent: 217.9 g/Val
c = dihydroxydiphenylsulfone diglycidyl ether: epoxide equivalent: 188.7 g/Val
d = N,N,O-triglycidyl-p-aminophenol: epoxide equivalent: 95–107 g/Val
[5] After ca. 2 h, in Ex. 9 and 10 after ca. 10 h, turbidity of the solution and precipitation of the polymers result
[6] In Ex. 9 and 10 cyclohexanon is used as solvent

What is claimed is:
1. A substantially linear thermoplastic polyarylene ether sulfone having a reduced viscosity of about 0.25 to about 1.5 dl/g (measured in a 1% solution in DMF at 25° C.) and consisting essentially of 95-99.8% by weight of segments of formula I and of 5-0.2% by weight of segments of formula IIa, formula IIb and/or formula IIc

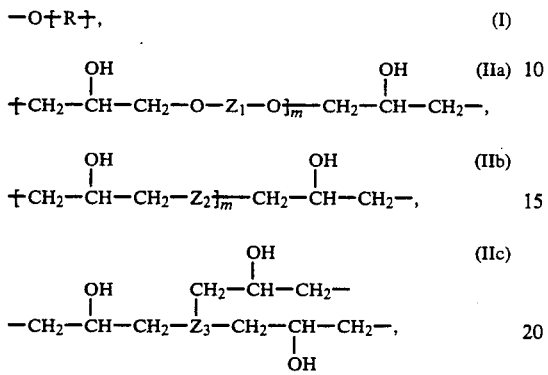

the percentages by weight being based on the entire polymer and the molecular weight (number average) of the segments of formula I being 6,000 to about 60,000, if the polymer contains solely structural units of formula IIa and/or IIb, and 1,000 to about 60,000 if the polymer contains more than 0.1% by weight of structural units of formula IIc, and R is selected from the group consisting of the recurring structural units of formula Ia and of up to 99.8% by weight, based on the total polymer, of recurring structural units of Ib

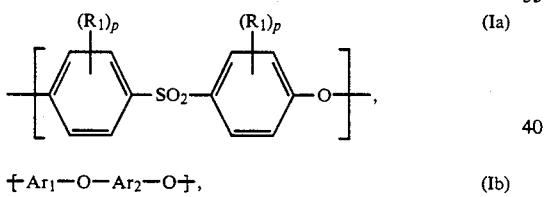

wherein $R_1$ is $C_1$-$C_6$alkyl, $C_3$-$C_{10}$alkenyl, phenyl or halogen, p is an integer from 0 to 4, $Ar_1$ and $Ar_2$ are each independently of the other divalent carbocyclic-aromatic radicals, $Z_1$ is a divalent radical of a cycloaliphatic, aromatic or araliphatic dihydroxy compound after removal of both hydroxyl groups, $Z_2$ is a divalent radical of a cycloaliphatic, aromatic or araliphatic disecondary amino compound after removal of both N-hydrogen atoms, m is an integer from 1 to about 10, and $Z_3$ is a trivalent radical of a cycloaliphatic, aromatic or araliphatic compound containing hydroxy and/or amino groups after removal of the hydroxyl groups and/or active hydrogen atoms bound to amino nitrogen atoms, which radicals $Ar_1$, $Ar_2$, $Z_1$, $Z_2$ and $Z_3$ may be substituted by one to four $C_1$-$C_6$alkyl groups, $C_3$-$C_{10}$alkenyl groups, phenyl groups or halogen atoms, and in which radicals $Z_1$, $Z_2$ and $Z_3$ one, two, three or four ring carbon atoms may be replaced by oxygen, sulfur and/or nitrogen atoms.

2. A polyether sulfone according to claim 1, wherein $Ar_1$ is a radical selected from the group consisting of formulae IIIa to IIIe

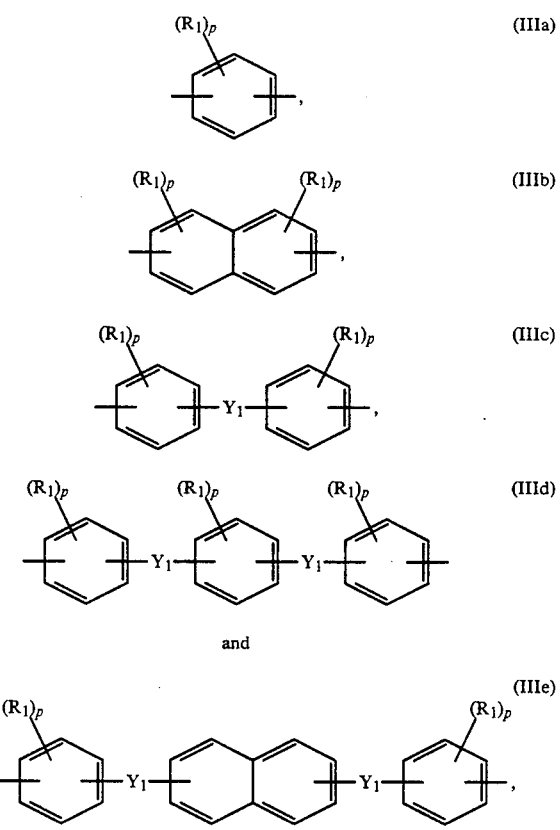

wherein $R_1$ and p are as defined above, and $Y_1$ is a direct bond, —$SO_2$—, —CO—, —S—, —SO—, —$CH_2$—, —$C(CH_3)_2$—, —$C(C_6H_5)_2$—, —$C(CH_3)(C_6H_5)$— or —$C(CF_3)_2$—.

3. A polyether sulfone according to claim 1, wherein $Ar_2$ is a radical of formulae IIIc, IIId or IIIe according to claim 2, wherein $Y_1$ is —$SO_2$—, —CO— or —SO—.

4. A polyether sulfone according to claim 1, wherein $Z_1$ is a radical selected from the group consisting of formulae IVa to IVg

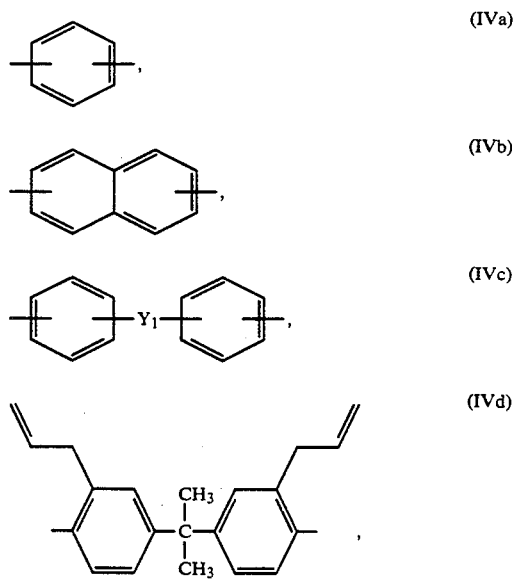

-continued
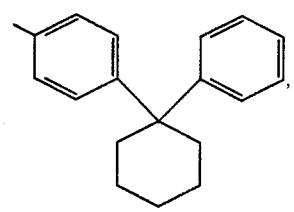
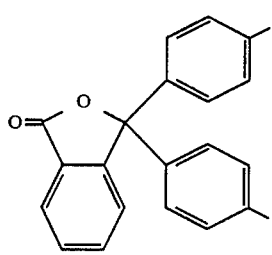
and
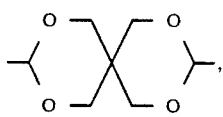 (IVg)
wherein Y₁ is as defined in claim 2.
5. A polyether sulfone according to claim 1, wherein $Z_2$ is a radical selected from the group consisting of formulae Va to Vj
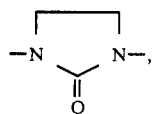 (Va)
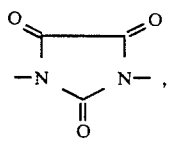 (Vb)
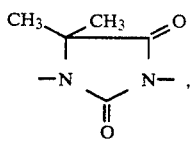 (Vc)
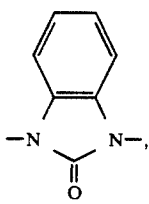 (Vd)
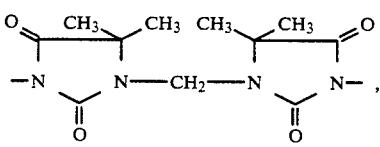 (Ve)
-continued
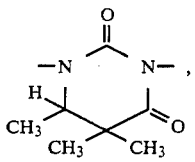 (Vf)
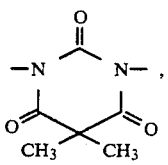 (Vg)
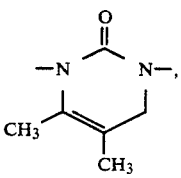 (Vh)
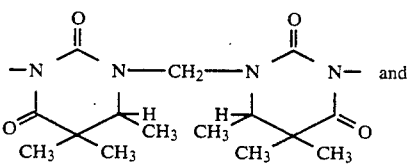 (Vi) and
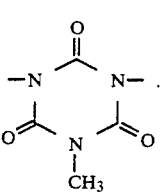 (Vj)
6. A polyether sulfone according to claim 2, wherein Ar₁ is selected from the group consisting of
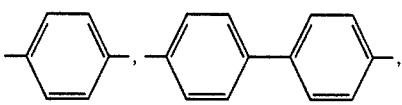
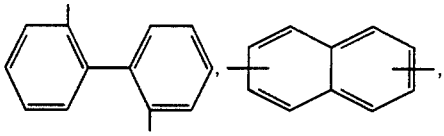
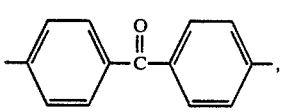
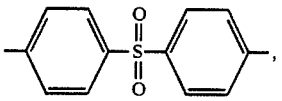
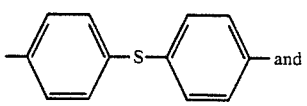 and -continued

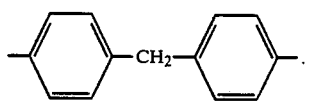

7. A polyether sulfone according to claim 3, wherein Ar$_2$ is selected from the group consisting of

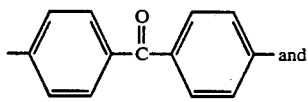

and

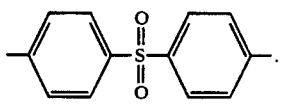

8. A polyether sulfone according to claim 4, wherein Z$_1$ is selected from the group consisting of

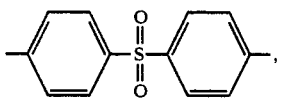

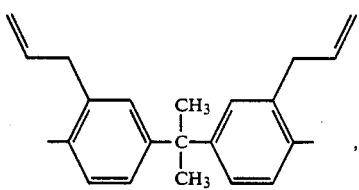

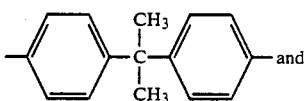

and

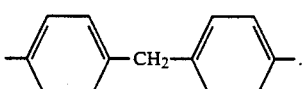

9. A polyether sulfone according to claim 1, wherein Z$_3$ is selected from the group consisting of

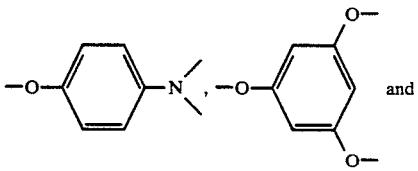

and

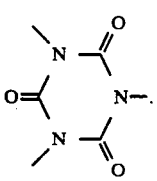

10. A polyether sulfone according to claim 1, wherein the segments of formula I have a molecular weight (number average) of 8000 to 20,000, if the polymer contains solely structural units of formula IIa and/or IIb, and 2000 to 20,000 if the polymer contains more than 0.1% by weight of structural units of formula IIc.

11. A polyether sulfone according to claim 1, wherein the molecular weight of the segments of formula I is 8000 to 20,000, if the polymer contains solely structural units of formula IIa and/or IIb, and 2000 to 20,000, if the polymer contains more than 0.1% by weight of structural units of formula IIc, Ar$_1$ is selected from the group consisting of

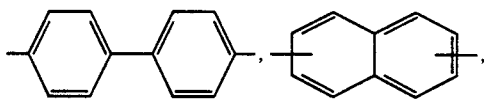

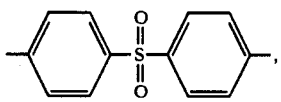

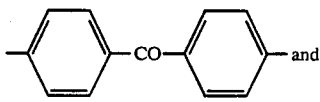

and

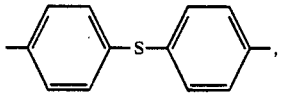

and Ar$_2$ is a radical of formula

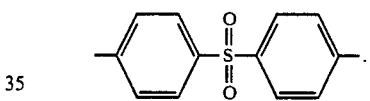

12. A polyether sulfone according to claim 1, wherein Z$_1$ is selected from the group consisting of

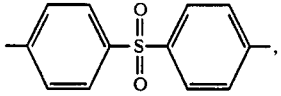

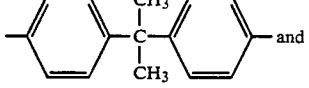

and

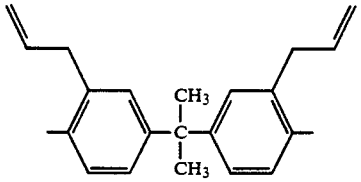

and m is an integer from 1 to 3.

13. A polyether sulfone according to claim 1 consisting of 95–99.8% by weight of segments of formula I, wherein R is a recurring structural unit of formula Ia, and 0.2–5% by weight of segments of formula IIa, wherein m is 1 or 2, said percentages being based on the total polymer.

14. A polyether sulfone according to claim 1, wherein the proportion of segments of formula IIa, IIb and/or IIc is 0.2–2% by weight, based on the total polymer.

* * * * *